Oct. 22, 1963     F. E. MINER     3,107,855
ODOMETER MECHANISM
Filed April 27, 1960     2 Sheets-Sheet 1

INVENTOR.
FLOYD E. MINER
BY
Chester W. Brown
ATTORNEY

Oct. 22, 1963  F. E. MINER  3,107,855
ODOMETER MECHANISM
Filed April 27, 1960  2 Sheets-Sheet 2

INVENTOR.
FLOYD E. MINER
BY
Chester W. Brown
ATTORNEY

United States Patent Office 3,107,855
Patented Oct. 22, 1963

3,107,855
ODOMETER MECHANISM
Floyd E. Miner, Crivitz, Wis.
(22 Endicott Road, Hamilton Square, Trenton, N.J.)
Filed Apr. 27, 1960, Ser. No. 25,090
2 Claims. (Cl. 235—139)

This invention relates to improvements in odometer mechanism.

An object of this invention is to provide an odometer or totalizer having inter-meshing gear mechanism which is always in gear meshing relation, thus insuring a dependable operation throughout the life of the device.

Another object is to provide an arrangement of the several parts which is sturdy in operation, simple in construction, relatively cheap to manufacture and assemble and which insures a minimum of servicing during its useful life.

A further object is to provide and embody in the odometer a combination of elements which is not easily damaged while operating and which will continue in proper alignment, thereby minimizing damage to the arrangement of operative elements.

Still another object is to provide mechanism which is simple in its mode of operation and arrangement of the component parts and which is reliable in functioning, thereby insuring a useful life for a period extending beyond its intended normal use.

Figure 1:
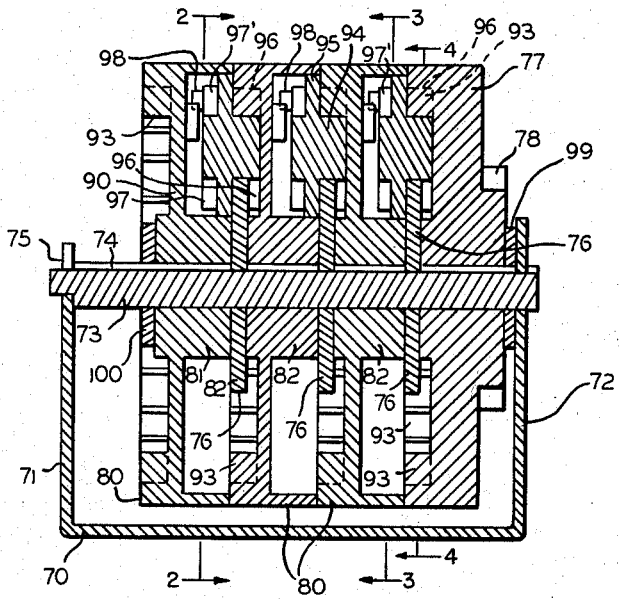
FIG. 1 is a side elevational view, in cross-section illustrating the embodiment of my invention.
Figure 2:
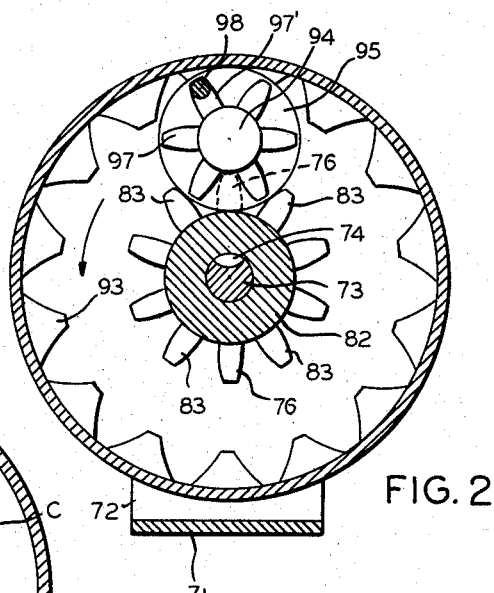
FIG. 2 is a sectional view taken on the line 2—2 relative to FIG. 1.

The odometer illustrated in FIGS. 1, 2, 3 and 4 embodies a base 70, spaced vertically extending sides 71 and 72 and a shaft 73 having a longitudinally extending arcuate groove 74. The shaft 73 extends at one end through an aperture in the side 72 which conforms to the annular contour of the shaft and holds the shaft against rotation. The opposite end of the shaft rests in a slot 75 in the side 71 and is preferably squared in cross-section to conform to the width of the groove and thereby aid in preventing rotation of the shaft.

Stationary gears 76 are mounted on the shaft and are apertured at 77a complementary to the cross-sectional contour of the shaft (see FIGS. 1 and 4), thereby holding the gears 76 against rotation. Adjacent the side 72, a counting wheel 77 is rotatably mounted on the shaft 73 and is provided with an advancing gear 78 for engagement with driving mechanism (not shown). Three substantially identical counting wheels 80 are rotatably mounted on the shaft 73, the stationary gears 76 being each disposed between adjacent counting wheels. The hub portion 81 of each counting wheel 80 is provided with an advancing gear 82 integral therewith and comprising two sets of four gear teeth 83 each, each set being spaced at 84 and 85 a distance which would be equal to that occupied by a gear tooth, thus providing two diametrically opposed interrupted areas for reasons hereafter specified.

Figure 3:
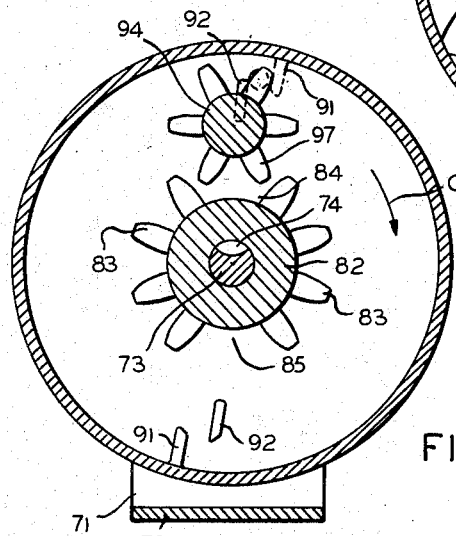
FIG. 3 is a sectional view taken on the line 3—3 relative to FIG. 1.
Figure 4:
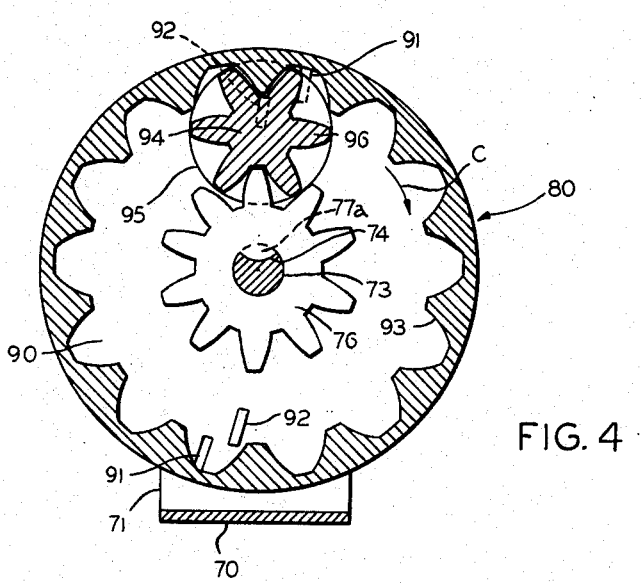
FIG. 4 is a sectional view taken on the line 4—4 relative to FIG. 1.

On the side of the web 90 of each of the wheels 80 corresponding to the advancing gear 82, are mounted pairs of lugs disposed diametrically opposite each other, each pair comprising a lug 91 adjacent the periphery of the wheel and a second lug 92 spaced inwardly of the periphery and to the rear relative to the lug 91 as indicated in FIGS. 3 and 4. Each of the counting wheels 77 and 80 is provided on a corresponding side with internal peripheral teeth 93. Substantially identical planetary or driving gears 94 are each disposed between adjacent counting wheels and comprise a disc-like portion 95 having on one side gear teeth 96 which mesh with the peripheral teeth 93 on the counting wheel and mesh with the teeth on the stationary gear 76. Gear teeth 97 are provided on the opposite side of disc-like portion 95 and are adapted for engagement alternately with the sets of teeth 83 on the advancing gear. One of the teeth 97' is provided with lug 98 positioned for engagement alternately with the lugs 91 and subsequently with lugs 92.

The operation of the FIGS. 1-4 is as follows: As the counting wheel 77 revolves in the direction of the arrow C (FIGS. 3 and 4), the planetary or driving gear 94 adjacent thereto, will rotate in a clockwise direction about its axis and revolve about the axis of the stationary gear 76 by reason of the engagement of the teeth 96 on the driving gear with the teeth 93 on the counting wheel and the teeth on the stationary gear. When the teeth 97 on the driving gear 94 are in mesh with the teeth 83 on the advancing gear 82, the counting wheel 80 adjacent the counting wheel 77 will be locked against rotation due to the engagement of the driving gear teeth 93 with the stationary gear teeth 76.

As viewed in FIG. 3, the driving gear teeth 97 are out of mesh with the teeth 83. During that period, the lug 98 on the tooth 97' is in engagement with the lug 91 on the counting wheel 80 and since the teeth 97 and 83 are disengaged, the wheel 80 is caused to rotate clockwise relative to FIG. 3. When the wheel 80 has rotated one-tenth of a revolution, the lug 98 on the driving gear will disengage the lug 91 on the counting wheel and simultaneously engage the lug 92 to stop rotation of the wheel and permit engagement of teeth 97 and 83 to hold the wheel non-rotative. When the driving gear 94 moves to the opposite side of the advancing gear 82, the same operation is performed as previously described and the counting wheel moves one-tenth of a revolution. The same sequence of operation takes place between adjacent counting wheels 80.

A washer 99 is mounted on the shaft 73 and disposed between the counting wheel 77 and side 72 on the base 70 and a second washer 100 is mounted on and secured (by means not shown) to the shaft 73 to hold the counting wheel in adjacent freely rotatable relation.

From the foregoing, it will be apparent that I have provided an odometer or totalizer in which the inter-connecting mechanism between the counting wheels is at all times in direct engagement without the provision of additional elements, in which the several elements are of simple design, are sturdy in construction, are easily assembled and are so related to each other as to insure a long life of usefulness with a minimum necessity of repair or replacement of parts.

It will further be apparent, that in the event that parts do become worn they may be easily replaced, certainly there is little possibility that the parts will become damaged by use or become misaligned and thereby mutilated and rendered useless.

Although the FIG. 1 arrangement permits disengagement of certain of the gear elements during accumulating operations, nevertheless, the arrangement is such as to insure that no forces are introduced tending to misalign the gearing mechanism and thus produce strains which may damage the totalizer.

Those skilled in the art will recognize that modifications may be made without departing from the spirit and scope of the invention herein disclosed and, therefore, I do not intend that the following claims carry unnecessary limitations, unless the terms thereof specifically justify such.

I claim:

1. In a totalizer of the class described, the combination with a pair of counting wheels in adjacent relation and rotatable about a common axis, of a stationary gear disposed between and concentrically related to said wheels, one of said wheels including a cylindrical portion having internally thereof gear teeth spaced radially of and concentrically relative to said stationary gear, an advancing gear carried by the other of said wheels adjacent to and concentric with said stationary gear, said advancing gear comprising two sets of teeth each disposed on opposite sides of a plane coincident with said axis and providing two diametrically opposed areas each minus a tooth, a driving gear including a set of teeth meshed with said internal teeth and with said stationary gear and a second set of teeth alternately in mesh with each of said two sets of teeth, a lug on one of said second set of teeth projecting laterally toward said other wheel, a first pair of lugs on said other wheel each disposed diametrically opposite the other and correlated to one of said opposed areas and engageable by said lug by said one of said second set of teeth, and a second pair of lugs on said other wheel each disposed diametrically opposite the other radially inwardly relative said first pair of lugs and rearwardly thereof relative to the direction of rotation of said wheels.

2. In a totalizer of the class described, the combination with a pair of counting wheels in adjacent relation and rotatable about a common axis, of a stationary gear disposed between and concentrically related to said wheels, one of said wheels including a cylindrical portion having internally thereof gear teeth spaced radially of and concentrically relative to said stationary gear, an advancing gear carried by the other of said wheels adjacent to and concentric with said stationary gear, said advancing gear having its teeth interrupted to provide at least one area minus a tooth, a driving gear including a set of teeth meshed with said internal teeth and with said stationary gear and a second set of teeth alternately in mesh with said teeth on said advancing gear and disengaged therefrom in said one area, a lug on one of said second set of teeth projecting laterally toward said other wheel, at least one first lug on said other wheel correlated to said one area and engageable by said lug on said one of said second teeth, and at least one second lug on said other wheel disposed radially inwardly relative said first lug and rearwardly thereof relative to the direction of rotation of said wheels.

References Cited in the file of this patent

UNITED STATES PATENTS

| 609,938 | Keyes | Aug. 30, 1898 |
| 1,797,273 | Miner | Mar. 24, 1931 |
| 2,656,107 | Vogler | Oct. 20, 1953 |
| 2,753,116 | Manke | July 3, 1956 |